United States Patent
Zimmer et al.

(10) Patent No.: US 12,128,547 B2
(45) Date of Patent: Oct. 29, 2024

(54) SYSTEM FOR RADIO CONNECTION OF AN ASSEMBLY TO A CONTROLLER

(71) Applicants: Martin Zimmer, Rheinau (DE); Günther Zimmer, Rheinau (DE)

(72) Inventors: Martin Zimmer, Rheinau (DE); Günther Zimmer, Rheinau (DE)

( * ) Notice: Subject to any disclaimer, the term of this patent is extended or adjusted under 35 U.S.C. 154(b) by 634 days.

(21) Appl. No.: 17/298,894

(22) PCT Filed: Nov. 5, 2019

(86) PCT No.: PCT/DE2019/000290
§ 371 (c)(1),
(2) Date: Jun. 1, 2021

(87) PCT Pub. No.: WO2020/094166
PCT Pub. Date: May 14, 2020

(65) Prior Publication Data
US 2022/0009107 A1   Jan. 13, 2022

(30) Foreign Application Priority Data

Nov. 5, 2018   (DE) .................... 10 2018 008 648.9

(51) Int. Cl.
| | | |
|---|---|---|
| *B25J 13/00* | (2006.01) | |
| *B25J 9/16* | (2006.01) | |
| *B25J 13/08* | (2006.01) | |
| *H04B 1/02* | (2006.01) | |
| *H04B 1/06* | (2006.01) | |
| *H04W 12/037* | (2021.01) | |
| *B25J 15/00* | (2006.01) | |

(52) U.S. Cl.
CPC .......... *B25J 13/006* (2013.01); *B25J 9/1612* (2013.01); *B25J 13/08* (2013.01); *H04B 1/02* (2013.01);
(Continued)

(58) Field of Classification Search
CPC .... B25J 19/0025; B25J 15/0408; B25J 15/04; B25J 19/0045; B25J 19/005; B25J 9/08; B25J 13/006; B25J 13/088; B25J 13/089; B25J 15/0019; B25J 15/0052; B25J 19/0004; B25J 19/0095; B25J 19/02;
(Continued)

(56) References Cited

U.S. PATENT DOCUMENTS 6,163,739 A * 12/2000 Park ....................... B25J 13/084
700/250
2005/0244260 A1   11/2005 Deplano
(Continued)

FOREIGN PATENT DOCUMENTS

| CN | 105598976 A | 5/2016 |
| DE | 102015012779 A1 | 4/2017 |

(Continued)

*Primary Examiner* — Truc M Do
(74) *Attorney, Agent, or Firm* — Smartpat PLC

(57) ABSTRACT

A system connects an assembly with at least one actuator and at least one sensor to a controller. The assembly is guided by a handling apparatus. The controller includes a radio master spatially separate from the handling apparatus and has a sending and receiving unit. The assembly is supplied with supply voltage by the handling apparatus. In or on the assembly, the supply voltage is transformed into a direct current target voltage with the aid of a DC/DC or AC/DC transformer. The direct current target voltage supplies the sending and receiving unit of the assembly.

12 Claims, 2 Drawing Sheets

(52) U.S. Cl.
CPC ............ *H04B 1/06* (2013.01); *H04W 12/037* (2021.01); *B25J 9/1697* (2013.01); *B25J 15/0042* (2013.01)

(58) Field of Classification Search
CPC ..... B25J 9/0084; B25J 9/06; B25J 9/12; B25J 9/126; B25J 9/161; B25J 9/1617
See application file for complete search history.

(56) References Cited

U.S. PATENT DOCUMENTS

| | | | |
|---|---|---|---|
| 2007/0276538 A1* | 11/2007 | Kjellsson | ............. B25J 19/0025 901/14 |
| 2011/0208353 A1 | 8/2011 | Kjellsson et al. | |
| 2015/0120041 A1 | 4/2015 | Wise et al. | |
| 2018/0049794 A1 | 2/2018 | Swayze et al. | |
| 2018/0152056 A1* | 5/2018 | Takahashi | ................ H02P 27/06 |
| 2018/0345499 A1* | 12/2018 | Mueller | ................... H02P 5/747 |
| 2019/0372341 A1* | 12/2019 | Wu | ......................... H02J 50/12 |
| 2020/0269417 A1 | 8/2020 | Riek et al. | |
| 2021/0197363 A1 | 7/2021 | Zimmer et al. | |

FOREIGN PATENT DOCUMENTS

| | | |
|---|---|---|
| DE | 102017009319 | 4/2019 |
| EP | 1591210 A1 | 11/2005 |
| EP | 1798007 B1 | 6/2008 |
| EP | 3476548 A1 | 5/2019 |
| WO | 2005059666 A1 | 6/2005 |

* cited by examiner

SYSTEM FOR RADIO CONNECTION OF AN ASSEMBLY TO A CONTROLLER

CROSS-REFERENCE TO RELATED APPLICATION

This application is a national stage application, filed under 35 U.S.C. § 371, of International Patent Application No. PCT/DE2019/000290, filed on Nov. 5, 2019, which claims the benefit of German Patent Application No. 10 2018 008 648.9, filed Nov. 5, 2018.

TECHNICAL FIELD

The disclosure relates to a system for connecting an assembly to a controller. The assembly is guided by a handling device and part of a multi-part adapter system including at least one actuator and at least one sensor. The handling device may be connected to a PLC and, in combination with the last link, be a 6-axis multi-link robot which carries a parallel gripper. For communication between the PLC and the parallel gripper, there is a bus master in the PLC which accesses the actuators and sensors of the parallel gripper, for example via at least one IO-link port.

BACKGROUND

An adapter system for connecting the last link of a kinematic chain of a handling device thereto is known from DE 10 2017 009 319 A1. The last link comprises a computing and storage module and at least one actuator and/or at least one sensor. Several system modules positioned one after the other are placed between the penultimate and the last link of the kinematic chain. A system module has an electronic assembly that adapts or converts the communication data of the incoming electrical connection lines to be exchanged with the system architecture with the peripheral interface of the last link and makes it available for communication via a wired transfer point.

A smart actuator usually also has smart sensors. The individual sensor consists of a basic sensor, evaluation electronics and at least one communication interface. The actuator and the sensors each have interfaces that typically need to be integrated into an existing system architecture in the automation environment of the handling device. Within the architecture, different hardware platforms run through more or less harmonized automation levels, which extend from the sensor and/or actuator bus via the field bus and the factory bus to the control level.

SUMMARY

The present disclosure is based on the challenge of creating a system for connecting an assembly to a controller, with which the assembly that is equipped with actuators and sensors can be integrated into any system architecture of the controlling and regulating background software and hardware—without signal lines being laid over the handling device.

This challenge is resolved with the characteristics of the main claim. The controller includes a radio master that is spatially separated from the handling device and has at least one transmitting and receiving device. The assembly comprises at least one transmitting and receiving device for communicating with the radio master. The assembly is supplied with a supply voltage by the handling device. In or on the assembly, the supply voltage is converted to a direct target voltage using a DC/DC or an AC/DC converter. The DC target voltage supplies the transmitting and receiving device of the assembly.

Typically, commercially available handling devices have different power supplies and communication methods. Consequently, the manufacturer of terminal devices, which are arranged as the last link in the kinematic chain of handling devices, must individually adapt their terminal devices to these power supplies and modes of communication. In order to avoid complex hardware adaptations, the disclosure provides a system which, on the one hand, uses radio technology, a so-called bridge technology, to transmit control information from the controller to which the handling device is connected to the respective terminal device, e.g., a gripper. On the other hand, the terminal device comprises a communication module in which the power supply of the handling device is matched to that of the terminal device. The communication module is thus an interface which transmits the supplied energy and the information received by radio to the respective terminal device via an IO-link cable.

The multi-part adapter system consists of a group of individual system modules which are arranged one behind the other in several layers. Some of them can be interchanged in any order. Since a wireless IO-link master for multiple ports can be integrated into the communication module instead of a wireless IO-link port, it is possible to provide a system module with multiple branches to transport and control multiple grippers.

Further details of the invention emerge from the subclaims and from the following description of at least one schematically illustrated embodiment.

DETAILED DESCRIPTION

Figure 1:
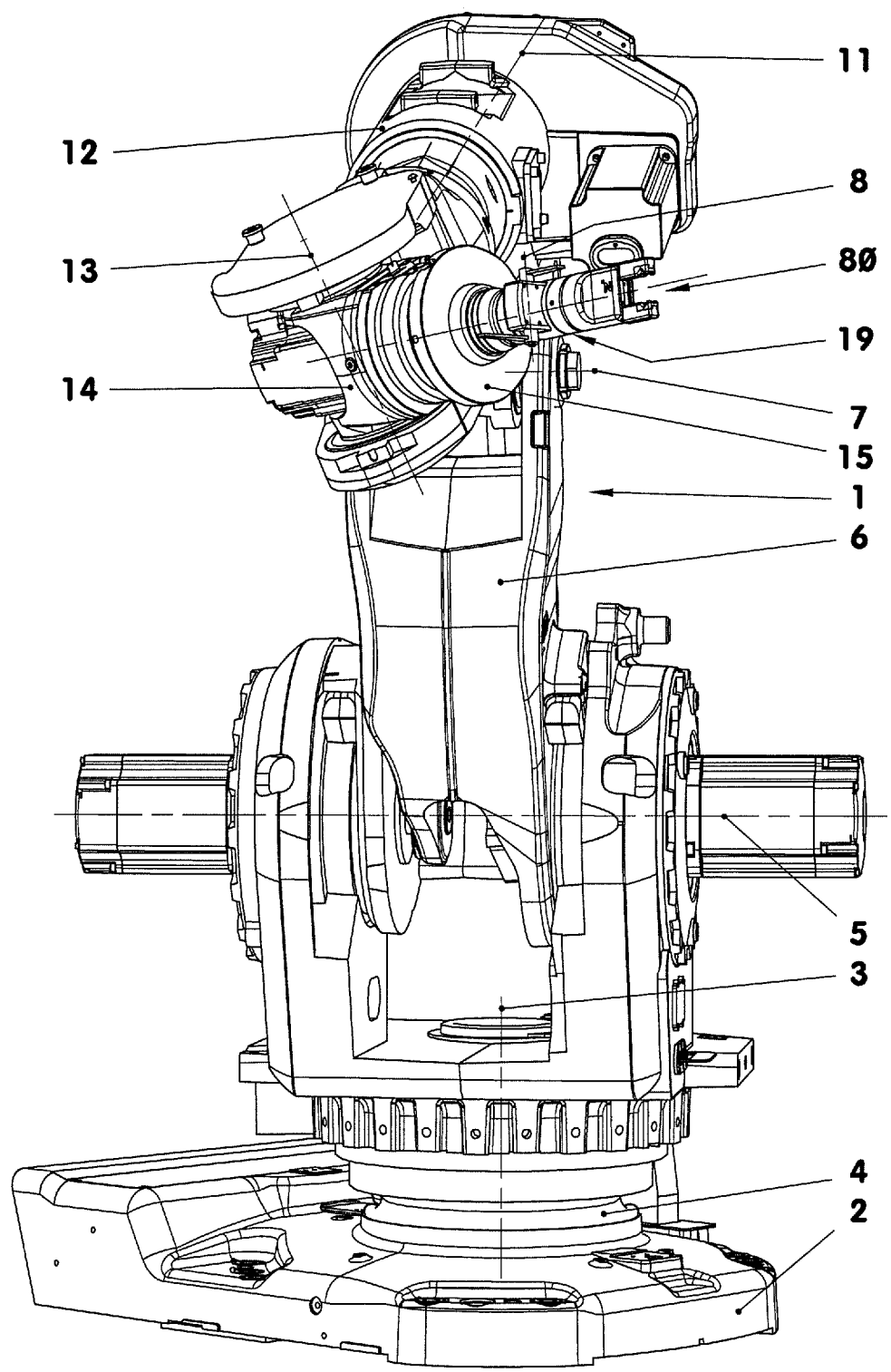
FIG. 1 is a perspective view of a handling device with a suitable gripper adapted via an adapter system.

FIG. 1 shows a handling device (1) designed as an articulated robot with so-called RRR kinematics. The kinematic series structure of the articulated robot (1) has three main rotary axes and three secondary rotary axes. The main axes represent the A-axis (3), the B axis (5) and the C-axis (7). The A-axis (3) is a turntable (4) with a vertical axis of rotation, which is mounted on the base plate (2) of the handling device. The turntable (4), as the first link in the kinematic chain, supports a lower arm (6) which can pivot around the horizontal B-axis (5), for example 210 degrees. At the free end of the lower arm (6), the C-axis (7), which carries the upper arm (8), forms a joint with a horizontal pivot axis. The upper arm (8) can be rotated for example 270 degrees relative to the lower arm (6).

The first minor axis, the D-axis (11), is an axis of rotation. It consists of a support arm (12) which can be rotated around its longitudinal axis and which is mounted on the free end of the upper arm (8). The second minor axis is the E-axis (13), around which the hand lever (14) is mounted so that it can pivot, for example, 270 degrees. The hand lever (14) carries a rotating plate which can be rotated 360 degrees, and which is rotatably mounted about the F-axis (16). The rotating plate is the penultimate link (15) of the kinematic chain. The adapter system (19), together with the gripper (80), is attached to it. In the exemplary embodiment, the adapter system (19) comprises the system modules (20, 30, 40, 50, 90). The number of system modules is not specified. Other system modules can be installed between the system modules (30) and (90).

With a suitably coordinated control of the individual axes (3, 5, 7, 11, 13, 16), almost any straight or curved path can be executed in the working area of the articulated robot (1). This can also be achieved with manipulation devices based on a cartesian, cylindrical or polar robot. The robots then have a corresponding TTT, RTT or RRT kinematics. The "T" stands for translatory and the "R" for the main rotary axes or guides.

Instead of these robots, a manipulation device can also be used, which, instead of the serial structure, has a parallel or hybrid structure. Tripods, pentapods or hexapods can be used as parallel structures.

Figure 2:
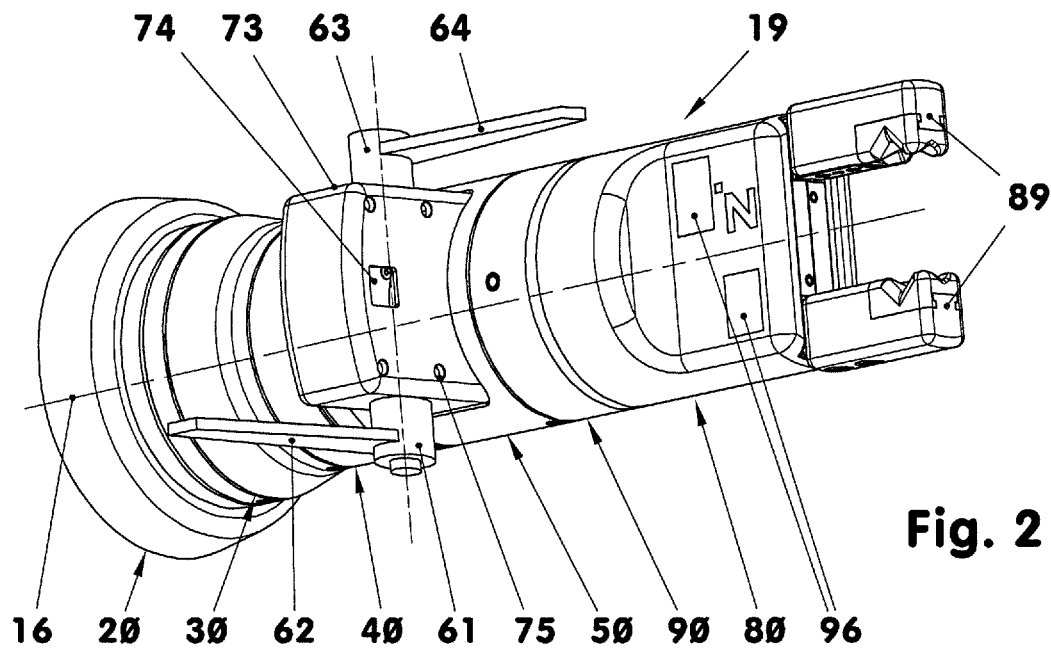
FIG. 2 is an enlarged perspective view of the adapter system with the gripper according to FIG. 1.

FIG. 2 shows an enlarged view of the adapter system (19), with a gripper (80). In the exemplary embodiment, the adapter system (19) comprises four modules arranged one behind the other. These are in sequence a mechanical module (20), a connection module (30), a deformation module (40) and a communication module (50).

The mechanical module (20) has a base module housing which is at least partially frustoconical, by means of which it is rigidly fixed to the rotating plate (15). For this purpose, the base module housing has, for example, a large square pin on its upper side, which positively engages in a corresponding recess in the rotating plate (15). The top and bottom of the base module housing are connected to each other through a central through hole. A pneumatic hose and a wire harness made up of a large number of wires and strands pass through the through hole—not shown here.

The mechanical module (20) forms a mechanical interface with the next module, the connection module (30). The connection module (30) has a connection housing, which is also in parts frustoconical. An inlet pipe for the compressed air supply is arranged in the upper part of the connection housing. There is a cable tie next to the inlet pipe, with which the above mentioned wire harness is locked in place in the mechanical module.

The individual wires and strands of the cable bundle held in the cable tie are secured in the hollow connection housing of the connection module (30), for example to a connection socket arranged in the middle on the underside of the connection housing (30).

According to FIG. 2, the connection module (30) is followed by the deformation module (40). To connect the two modules (30) and (40), the deformation module (40) has in the middle of its upper face a connector which corresponds to the connection socket of the connection module (30).

The deformation module (40) consists essentially of an upper housing part, a lower housing part and an elastomer layer in between. The elastomer layer represents a flexible housing wall.

In the deformation module (40), for example, a force-torque sensor is integrated into a spoke design. This sensor consists of a square spoke foot ring with a central disc, a head ring and square columns. The square columns connect the disc to the head ring. A pair of strain gauges is arranged on each column and each spoke. The forces and moments acting on the coordinate axes can be determined from the elastic strains of the columns and/or spokes via the resistance changes of the strain gauges. The foot ring is attached to the upper housing portion of the deformation module (40), while the head ring is attached to the lower housing portion of the deformation module (40). The signals emitted by the sensor are converted into force and torque values via a 6×8 matrix vector multiplication. The deformation module has its own calculation module for this purpose. The calculated values are transmitted via the lines and the contact points of the modules of the adapter system to the computing and storage unit of the gripper in order to there adapt the calculated values to the length of the lever, which—depending on the adapter system structure—extends between the deformation module (40) and the gripper arms (89).

The deformation module (40) has a connection plug centrally disposed in the upper part of the housing, while the lower part of the housing has a central connection socket, as is already known from the connection module (30).

The deformation module (40) measures the bending of the combination of at least one system module and the last link (80) in two mutually perpendicular planes, wherein the intersection of the two planes is the center line (16) of the system modules (20, 30, 40, 50). The determined bending is, for example, a measurement of the load on the loaded gripper (80).

A communication module (50) is connected to the deformation module (40) via a connector plug, which is also in the center, via which, among other things, the power supplies also reach the connection socket located on the underside—with the interposition of a DC/DC converter. The communication module (50) has a communication housing in some areas with an outer wall which is cylindrical at least in some areas.

Figure 3:
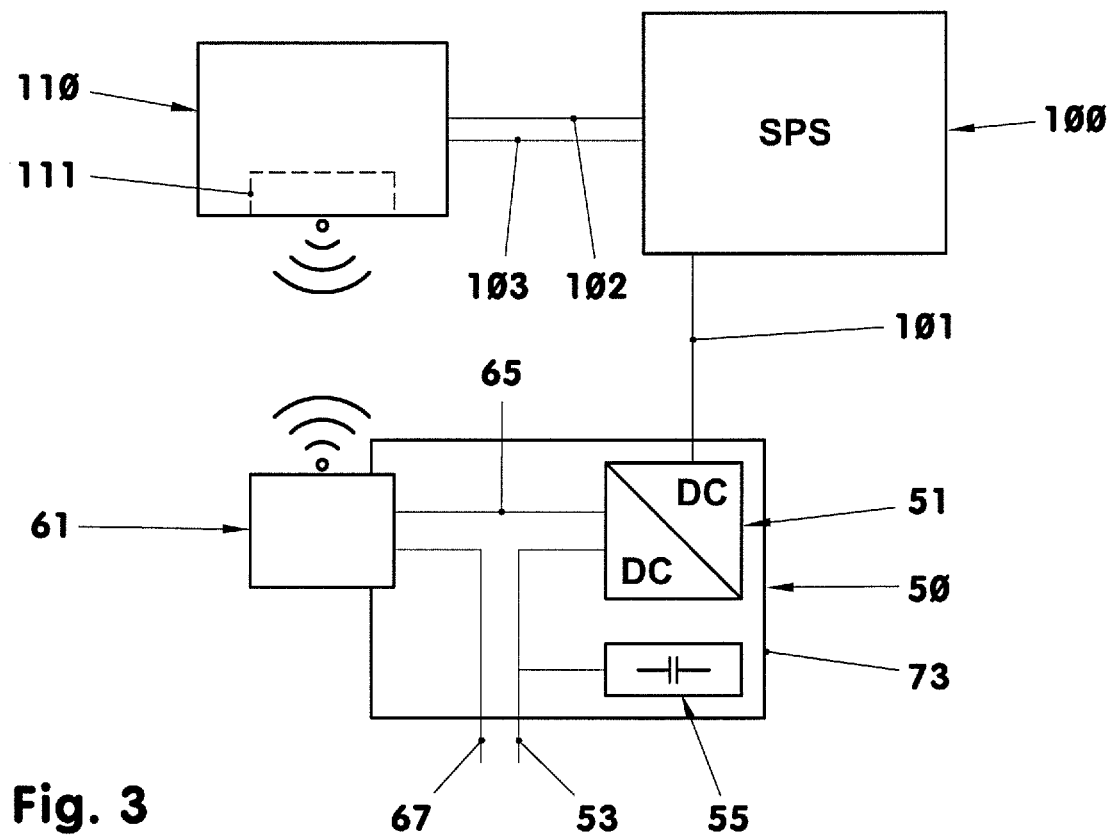
FIG. 3 is a schematic representation of the wireless communication between the PLC and the gripper in combination with the voltage conversion of the supply voltage of the gripper.

A DC/DC converter (51) is arranged as a power interface inside the communication housing, see FIG. 3. It converts the supply voltage offered via the handling device (1) by the controller (100) by means of the load line (101), for example a direct voltage of 48 volts, into a direct current target voltage. In the exemplary embodiment, a 24 V direct current target voltage is required, which is transmitted via the load line (53) to the gripper (80) or to the system module following the communication module (50).

If the robot (1) supplies AC voltage, for example, an AC/DC converter is used instead of the DC/DC converter (51). If the robot (1) supplies a voltage lower than the target DC voltage, a converter is installed which increases the voltage of the robot to the required target DC voltage.

In addition, a capacitor (55) can be connected in parallel with the DC/DC converter (51) as a so-called booster, see FIG. 3. As an additional energy storage, the capacitor can intercept short current peaks and thus provide the assembly (80) with more energy for a relatively short period of time than can be permanently made available by the handling device (1). The time interval is between a few milliseconds and one second, depending on the power consumption. The capacitance of the capacitor can be 100 mF, for example.

At least one transmitting and receiving device (61, 63), to which at least one antenna (62, 64) is connected, is arranged in or on the communication module (50). These transmitting and receiving devices (61) and/or (63) communicate bidirectionally with the corresponding transmitting and receiving devices (111) of a radio master (110) connected to the controller (100) according to FIG. 3 via the load line (102) and the signal line (103). In the exemplary embodiment, the radio master (110) is an IO-link wireless master. Each transmitting and receiving device (61, 63) shown in FIG. 2 has a corresponding transmitting and receiving device in the radio master (110).

The IO-link wireless master communicates with 2.4 GHz, for example. Its usual radio range is for example 10 m.

The transmitting and receiving device (61, 63), also called an IO-link bridge, is part of an electronic system which belongs to an electronic assembly that is, for example, built on a plurality of printed circuit boards. Of course, the IO-link bridge, as well as the antennas (62, 64), can also count as separate modules for the electronics assembly.

In the adapter system (19), the electronics assembly is connected to the gripper (80) and at least some of the integrated system modules (20, 30, 40, 50, 90) with a wire or optical fiber. The IO-link bridge (61, 63) and the electronics are connected to the output of the DC/DC converter (51) via the voltage supply line (65), see FIG. 3.

Accordingly, in the present system, the gripper (80) receives its energy from the power supply of the robot (1). In contrast to this, the gripper (80) does not receive its control signals via a cable harness that is guided along the robot (1), but by radio via a the transmitting and receiving device (61, 63) of the communication module (50) from the radio master (110) located in the area of the controller.

In FIG. 2, the housing of the communication module (50) has at least one approximately cuboid bulge (73) on the side as a camera housing. A camera (74) can be housed in the bulge. Its camera lens is arranged behind a recess in the underside of the bulge (73). The optical axis of the camera lens intersects the clamping space between the gripping arms (89) of the gripper (80) approximately in the middle. The field of view of the camera (74) thus captures the part to be gripped and the gripping arms (89). Around the camera lens, for example, four light emitting diodes (75) are arranged on the underside of the bulge (73), which illuminate the clamping space.

On both sides of the bulge (73), for example, the two wireless IO-link adapters are arranged as transmitting and receiving devices (61, 63). An antenna (62, 64) is arranged on each transmitting and receiving device (61, 63). The two antennas (62, 64) are rotated by 90° relative to each other to improve transmission and reception properties. The antenna (64) is positioned, for example, parallel to the center line of the adapter system (19). Of course, the two antennas (62, 64) can also be aligned parallel to each other.

According to FIG. 2, the gripper (80) is docked on the communication module (50) as the last link in the kinematic chain.

The gripper (80) consists of an electronic part and a mechanical part. The gripper is attached to the communication module (50) via its housing. It is plugged into the connection socket of the communication module (50) with its connector.

In order to be able to connect the modules (30, 40, 50) and the gripper (80) to each other securely, easily and quickly, the modules and the gripper (80) are each mechanically coupled, for example via a bayonet lock. For this purpose, all of the individual module housings and the gripper housing in the edge area of the respective upper side have several bayonet tongues distributed around the circumference. The module housing and the gripper housing have individual bayonet rings in the edge area of their respective undersides, which are mounted there on a fine thread. The individual bayonet ring has a circumferential bayonet bar on its underside, which has at least as many interruptions along the circumference as there are bayonet tongues in the module housings.

To connect the module housings to each other, the connection plugs and the connection sockets of the modules to be connected are plugged into one another, wherein the bayonet tongues pass the interruptions of the bayonet ring with clearance. By screwing in the bayonet ring, the individual bayonet bar axially rests on the adjacent bayonet tongues, so that the module housings are pulled against each other by the fine thread. In order to specify a defined holding force, the bayonet ring may have a rotation stop.

Once the bayonet ring has been tightened, the modules (30, 40, 50) and the gripper (80) are secured to each other by hand—without the use of tools. In this case, all electrical contacts are established between the adapter geometries that make contact with one another.

During coupling, the modules are also connected to each other pneumatically. For this purpose, an inlet pipe installed in the center of the individual connection socket, in a centering and gas-tight manner, dips into an inlet hole arranged in the center of the respective connection plug.

If necessary, the modules (30, 40, 50) and the gripper (80) are secured against mutual rotation around the center line (16) with a combination of dowel pins and dowel holes.

Of course, the modules (30, 40, 50) and the gripper (80) can also be secured against one another by other means.

In the gripper (80), the gripper housing is adjacent to the base housing. The gripper housing is mounted in the base housing, for example, via a carrier insert—not shown. The carrier insert secures the gripper housing by embracing it from the rear. A cylinder-piston unit is arranged in the gripping housing as an adjusting drive for the gripping arms (89). The piston of the cylinder-piston unit moves the gripping arms (89) on the slide using a double wedge hook gear. With each stroke movement of the piston rod, the slides are positively moved in their guides transversely to the center line (16). The end positions of the piston can be edited using at least two sensors. If necessary, pressure sensors on the corner hooks measure the clamping forces applied to the gripper arms while holding the workpieces.

Further, at least one pneumatic valve may be arranged in the base housing to supply or release compressed air to/from the cylinder pressure chambers of the cylinder-piston unit in an electronically controlled manner.

Instead of the gripper (80) shown in FIG. 2, an electromechanically driven gripper can also be used, see parallel gripper from DE 10 2015 012 779 A1.

A servo-controller or a full-fledged servo axis controller is integrated into the housing of such a gripper, with an associated computing and storage module. The servo-controller is programmed at the factory so that the end user or machine operator does not need special knowledge to adapt the gripper to the objects to be gripped or the corresponding workpieces. The objects to be gripped can be dimensionally stable or elastic.

In addition to the simple parameters, such as the gripping stroke and the elasticity and gripping distance-dependent gripping stroke allowance, special cataloged gripping recipes can be stored in the calculation and memory module for certain, e.g., customer-specific gripping goods, which the machine operator can call up using a gripping item number. In this way, a quick switchover between two different known gripping tasks is possible.

For this purpose, the servo-controller and the associated calculation and memory module are located directly in the gripper housing. All gripper-specific values and controller settings are programmed directly into the gripper software by the manufacturer. The gripping recipes for new gripping tasks are taught manually by the operator of the customer's machine and stored directly and permanently in the computing and storage module on the device side, for example with a new item number. Either the next free number is automatically selected as the new item number, or it is entered numerically via the PLC input keyboard. Other configuration or learning processes are also usually specified using this keyboard.

The data records that are entered by the machine operator and depend on the item number can be changed or deleted without having to intervene in the programmable logic controller on the machine-tool side.

Optionally, measurement and evaluation algorithms are programmed into the gripper's computing and storage module, which can also measure and record environmental parameters such as the housing temperature, the housing vibration, noise from structure, etc. during the usual gripping function. These data are converted into wear statistics in order to determine the time of the next maintenance or device overhaul and to indicate that this time has been reached on the device, for example, acoustically or optically. The environmental parameters and/or their evaluation and interpretation can also be retransmitted to the programmable logic controller of the handling device (1) or to the system by radio from the computing and memory module via the data interface of the gripping device, i.e., the communication module. (50).

According to FIG. 2, two resistive force transducers, each in the form of an FSR sensor (96), are arranged on the gripper housing. Using these sensors, the gripper (80) can be opened or closed on site by the machine operator.

LIST OF REFERENCE SYMBOLS

1 Handling device, articulated robot, 6-axis robot
2 Base plate
3 A-axis
4 Turntable, first link
5 B-axis
6 Lower arm
7 C-axis
8 Upper arm
11 D-axis
12 Support arms
13 E-axis
14 Hand lever
15 Link, penultimate, rotating plate
16 F-axis, pivot axis, center line
19 Adapter system (sum of modules)
20 Mechanical module, first system module
30 Connection module, second system module
40 Deformation module, fourth module
50 Communication module, third module
51 DC/DC converter
53 Load line from (80)
55 Capacitor, energy storage, booster, optional
61, 63 Transmitting and receiving device, bridge module
62, 64 Antennas
65 Supply line from (61, 63)
67 Signal lines to and from (80)
73 Bulge; camera housing, optional
74 Camera, optional
75 Light emitting diodes, optional
80 Assembly, link, last; gripper
89 Gripping arms
90 Gripper base module, system module, base housing
96 FSR sensors
100 Controller (PLC)
101 Load line for (51), variable
102 Load line to (110)
103 Signal line to (110)
110 Radio master
111 Transmitting and receiving device of (110)

The invention claimed is:
1. A system, comprising:
a handling device (1);
an assembly (80) that includes at least one actuator and at least one sensor;
a multi-part adapter system (19) comprising a plurality of system modules, including a communication module (50), which are arranged one behind another in layers and connect the assembly (80) to the handling device (1); and
a radio master (110) operatively connected to a controller, the radio master (100) being spatially separated from the handling device (1) and including a transmitting and receiving device (111);
wherein the communication module (50) includes
a further transmitting and receiving device (61, 63) for communication with the radio master (110), and
a DC/DC or an AC/DC converter (51) for converting a supply voltage from the handling device (1) into a direct current target voltage for the further transmitting and receiving device (61, 63).
2. The system according to claim 1,
wherein the assembly (80) is a last link of a kinematic chain of the handling device (1), and
wherein the assembly (80) comprises a computing and storage module.
3. The system according to claim 1,
wherein the assembly (80) is a gripper, and
wherein a capacitor (55) is installed at an output of the DC/DC or the AC/DC converter (51) for energy storage, and
wherein the output of the DC/DC or the AC/DC converter (51) supplies the gripper with a DC target voltage.
4. The system according to claim 1,
wherein the assembly (80) includes a gripper having gripping arms (89); and
wherein the communication module (50) includes a housing having a bulge (73) in which a camera (74) is arranged to observe a space between the gripping arms (89).
5. The system according to claim 4,
wherein individual antennas (62, 64) of the further transmitting and receiving device (61, 63) are arranged on both sides of the bulge (73) of the communication module, (50).
6. The system according to claim 1,
wherein in each case an antenna (62, 64) of the communication module (50) communicates with an antenna of the radio master (110).
7. The system according to claim 1,
wherein between the transmitting and receiving device (111) of the radio master (110) and the further transmitting and receiving device (61, 63) of the assembly (80) actuator control signals and evaluated information of the at least one sensor are transmitted by radio.
8. The system according to claim 7,
wherein the actuator control signals and the evaluated information are encrypted.
9. A multi-part adapter system (19) arranged between a handling device (1) and a gripper (80), comprising:
a plurality of system modules, including a communication module (50), which are arranged one behind another in layers and connect the gripper (80) to the handling device (1), wherein the communication module (50) includes
- a transmitting and receiving device (61, 63) for communication with a radio master (110) that is operatively connected to a controller, the radio master (100) being spatially separated from the handling device (1), and
- a DC/DC or an AC/DC converter (51) for converting a supply voltage from the handling device (1) into a direct current target voltage for the transmitting and receiving device (61, 63).

10. The multi-part adapter system (19) according to claim 9,
wherein an output of the DC/DC or the AC/DC converter (51) supplies the gripper with a DC target voltage.

11. The multi-part adapter system (19) according to claim 10,
wherein the DC/DC or the AC/DC converter (51) receives power by a load line (101) from the handling device (1).

12. The system according to claim 1,
wherein the DC/DC or the AC/DC converter (51) receives power by a load line (101) from the handling device (1).

\* \* \* \* \*